Aug. 25, 1959

G. G. HEBARD 2,901,210

ELECTRO-MAGNETIC DEVICE

Filed June 29, 1953

INVENTOR.

BY *G. G. Hebard*

*Hudson & Young*

ATTORNEYS

Aug. 25, 1959  G. G. HEBARD  2,901,210
ELECTRO-MAGNETIC DEVICE
Filed June 29, 1953  2 Sheets-Sheet 2

INVENTOR.
BY G. G. Hebard
Hudson & Young
ATTORNEYS

United States Patent Office 2,901,210
Patented Aug. 25, 1959

2,901,210

ELECTRO-MAGNETIC DEVICE

Glen G. Hebard, Bartlesville, Okla., assignor to Phillips Petroleum Company, a corporation of Delaware Application June 29, 1953, Serial No. 364,596

4 Claims. (Cl. 25—137)

This invention relates to electromagnetic devices. In another aspect it relates to solenoid operated valves. In still another aspect it relates to solenoid operated gas-lift valves suitable for use in oil producing wells.

This application is a continuation-in-part application of my pending application Serial No. 306,190, filed August 25, 1952, now abandoned.

In various operations employing solenoid valves it is necessary that the valve be opened against a high back pressure which tends to maintain the valve head in a seated position whereby a large initial force is needed to overcome this back pressure. One particular example of the use of such a solenoid valve is found in a downhole kick-off valve in an oil well gas lift.

When sufficient gas pressure is no longer available from an oil producing reservoir to maintain a natural flow of oil from a producing well or when the flow column fills with water, it is often possible to restore the oil flow by introducing an additional volume of gas into the tubing at selected depths. This gas is injected at the well head into the space between the tubing and the outer casing and a number of valves are positioned at spaced intervals along the tubing to permit the flow of gas there through into the tubing. It is of course desirable that the interior of the tubing be maintained free of obstructions because it is necessary at times to insert various devices into the tubing for cleaning purposes or to make measurements such as the determination of reservoir pressure. To this end it is essential that a compact valve assembly be provided through which gas can be injected into the tubing. In order to conserve gas it is important that the valves do not leak when in the closed position, and one method of obtaining such a tight shut off is to arrange the valve such that the pressure outside the tubing tends to retain the valve head in its seated position. With such a valve assembly a relatively large force is required to overcome the back pressure and move the valve head off its seat. However, once the valve has been opened a slight amount the back pressure is lowered and a considerably smaller force is sufficient to move the valve head to its fully open position. Since space in the well is decidedly limited it is essential that a compact valve structure be provided without sacrificing the large starting force. The present invention is directed primarily toward providing solenoid valves which exert large starting forces.

Accordingly, it is an object of this invention to provide an electromagnetic device capable of exerting a large initial force over a short distance.

Another object is to provide a solenoid operated valve of small size which is capable of functioning against a large back pressure applied against the valve head.

A further object is to provide an electromagnetic device capable of exerting a large initial force over a short distance and a lesser force over a second longer distance.

A further object is to provide an improved gas-lift valve suitable for use in recovering oil from an underground reservoir.

In accordance with the present invention an improved electromagnetic device is provided which utilizes a pair of solenoids and associated magnetic circuits. To this end a first flat-faced plunger magnet with short air gap is employed to develop a large force over a short distance thereby moving the valve head initially off its seat and a second magnetic path with longer air gap is energized simultaneously or subsequently to deliver a longer stroke to open the valve fully. In delivering the longer stroke the second magnetic circuit does not provide as powerful a force as does the first magnetic circuit, but such powerful force is no longer necessary after the first magnetic circuit has moved the valve head initially off its seat to reduce the back pressure against the valve head. An electromagnetic device of this type is therefore, of value wherever overall size and solenoid current consumption are limiting factors.

Various other objects, advantages and features of this invention should become apparent from the following detailed description taken in conjunction with the accompanying drawing in which.

Figure 1:
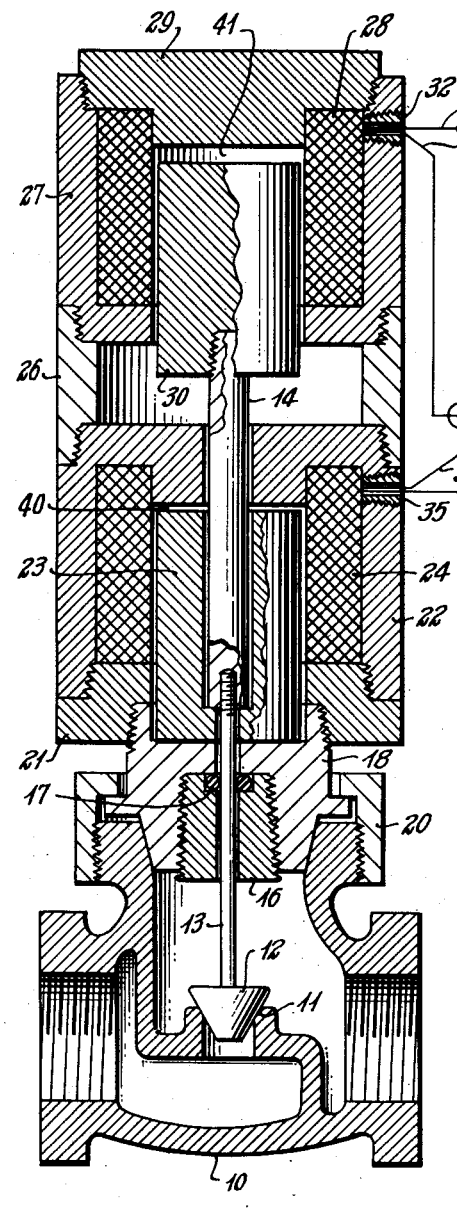
Figure 1 is a cross-sectional view of a solenoid operated valve constructed in accordance with this invention.

Referring now to the drawing in detail and to Figure 1 in particular there is illustrated a valve body 10 having a ground metallic seat 11 upon which normally rests a valve head 12. Valve head 12 is attached to the lower end of a first valve stem 13 which in turn is attached at its upper end to the lower end of a second valve stem 14, the latter being of larger diameter than valve stem 13. Valve stem 13 passes through a central opening in a plug 16 which houses an annular sealing ring 17. A nipple 18 which encloses plug 16 rests upon valve body 10 and a cap 20 is threaded to the upper portion of valve body 10 to retain nipple 18 in fluid tight contact therewith. An annular base 21 is threaded to the upper portion of nipple 18 and a first annular housing member 22 is in turn threaded to base 21. A hollow cylindrical sleeve 23 forms an armature which is disposed about valve stem 14 and normally rests on the upper surface of nipple 18, the lower edge of armature 23 being flanged inwardly to support the lower edge of valve stem 14. A first solenoid 24 is mounted on base 21 between armature 23 and housing member 22, the latter two elements being of such configuration that armature 23 extends downward beyond the lower end of solenoid 24 and the upper portion of housing 22 extends downwardly into a portion of the interior of solenoid 24 so as to be in closely spaced relation with armature 23. A connecting ring 26 is threaded to the upper end of housing 22 and extends upward therefrom to support a second annular housing member 27 which is threaded thereto. Housing 27 supports a second solenoid 28 and a second armature 30 is attached to the upper end of valve stem 14 so as to be positioned partially inside and partially outside the interior of solenoid 28. A plug 29 is threaded to the upper portion of housing 27, plug 29 being of such configuration as to extend downwardly into a portion of the interior of solenoid 28, so as to be in closely spaced relation with armature 30.

A first connector plug 32 is threaded in casing 27 to provide a passage for electrical leads 33 and 34 which are connected to solenoid 28, and a second connector plug 35 is threaded in housing 22 to provide a passage for electrical leads 36 and 37 which are connected to solenoid 24. A voltage source 38 having a switch 39 connected thereto is applied across both solenoid 24 and solenoid 28. Source 38 can supply either direct or alternating current.

Housing 22, base 21 and armature 23 are constructed of a magnetic material whereas nipple 18 and valve stem 14 are constructed of a non-magnetic material such as brass. The valve assembly is of such configuration that the upper edge of armature 23 is separated from housing 22 by a short air gap 40 when valve head 12 is positioned on valve seat 11. Valve head 12 normally remains seated because of the back pressure thereon. If desired, a compression spring can be positioned between valve head 12 and plug 16. Closure of switch 39 results in current flow through solenoid 24 which forces armature 23 to move upward through air gap 40 thereby lifting valve head 12 a short distance off valve seat 11, which distance is equal to the length of air gap 40. Plug 29, housing 27 and armature 30 are constructed of magnetic material and this portion of the valve assembly is of such configuration that the upper edge of armature 30 is separated from plug 28 by a second air gap 41 whenever valve head 12 is positioned on valve seat 11. Closure of switch 39 also energizes solenoid 28 which forces armature 30 to move upward through air gap 41. It should be noted that air gap 41 is of greater length than air gap 40 such that movement of armature 30 through air gap 41 results in movement of valve head 12 a greater distance off valve seat 11 than does movement of armature 23 through air gap 40. The tractive force exerted upon armature 30 is of lesser magnitude than the force exerted upon armature 23 because of the longer air gap. However, once valve head 12 is moved a slight distance off valve seat 11 the back pressure exerted upon valve head 12 is reduced such that less force is needed to move valve head 12 to its fully open position. Thus, solenoid 24 exerts a large force to move armature 23 through air gap 40 whereas solenoid 28 exerts a lesser force to move armature 30 through the longer air gap 41.

Figure 2:
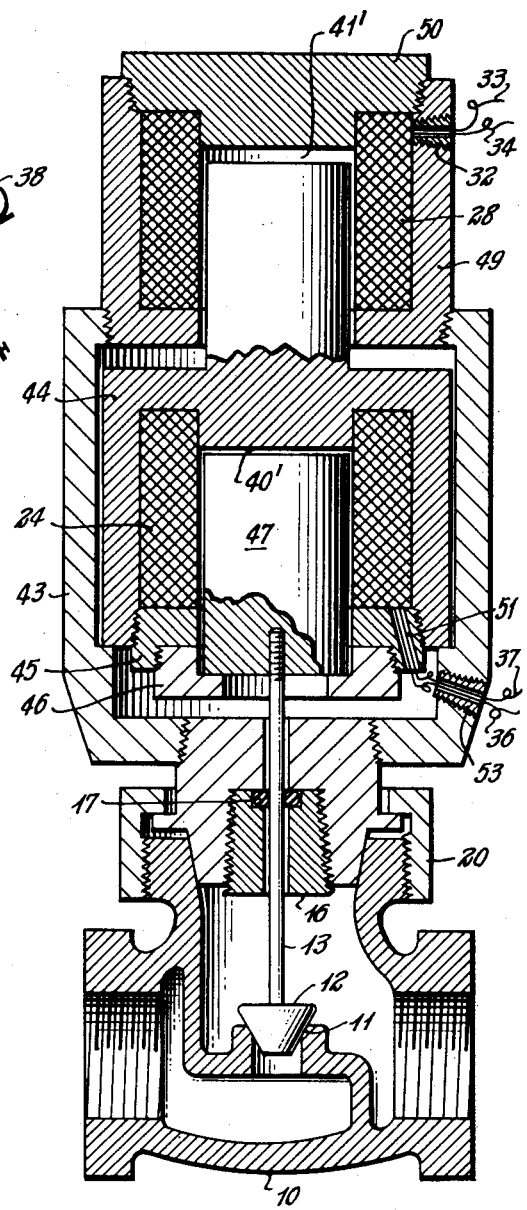
Figure 2 is a cross-sectional view of a second embodiment of solenoid operated valve.

In Figure 2 there is illustrated a second embodiment of a valve assembly somewhat similar to that illustrated in Figure 1 and corresponding parts are designated by like reference numerals. An annular member 43 is threaded to the upper portion of nipple 18 so as to support a first armature assembly 44 which has a first annular base 45 threaded to the lower portion thereof. A second annular base 46 is threaded to base 45, and base 46 in turn supports a second armature 47 which is connected to the upper end of valve stem 13. Solenoid 24 is contained within armature assembly 44 and rests upon the upper surface of base 45. A housing 49 is threaded to the upper end of member 43 and solenoid 28 is positioned within housing 49 so as to enclose the upper portion of armature assembly 44. A plug 50 is threaded to the top of housing 49. A passage 51 is drilled in connecting member 45 and a connecting plug 53 is threaded in member 43 such that leads 36 and 37 which are connected to solenoid 24 can pass out of the housing assembly. Electrical leads 33, 34, 36 and 37 are connected across a voltage source, not shown, in the same manner as are the corresponding leads in Figure 1. Plug 50, housing 49, armature assembly 44, base 45 and armature 47 are constructed of magnetic material and base 46 is constructed of non-magnetic material.

The application of energizing current to solenoid 24 moves armature 47 upward through a first air gap 40′ which corresponds to air gap 40 in Figure 1. Application of energizing current to solenoid 28 moves armature assembly 44 upward through a second air gap 41′ which corresponds to air gap 41 in Figure 1. It should be noted that base 46 and base 45 are secured to and supported from armature assembly 44 such that armature 47 and valve head 12 both are lifted upward by the application of energizing current to solenoid 28. The overall operation of the valve of Figure 2 is, therefore, essentially the same as the operation of the valve of Figure 1.

Figure 3:
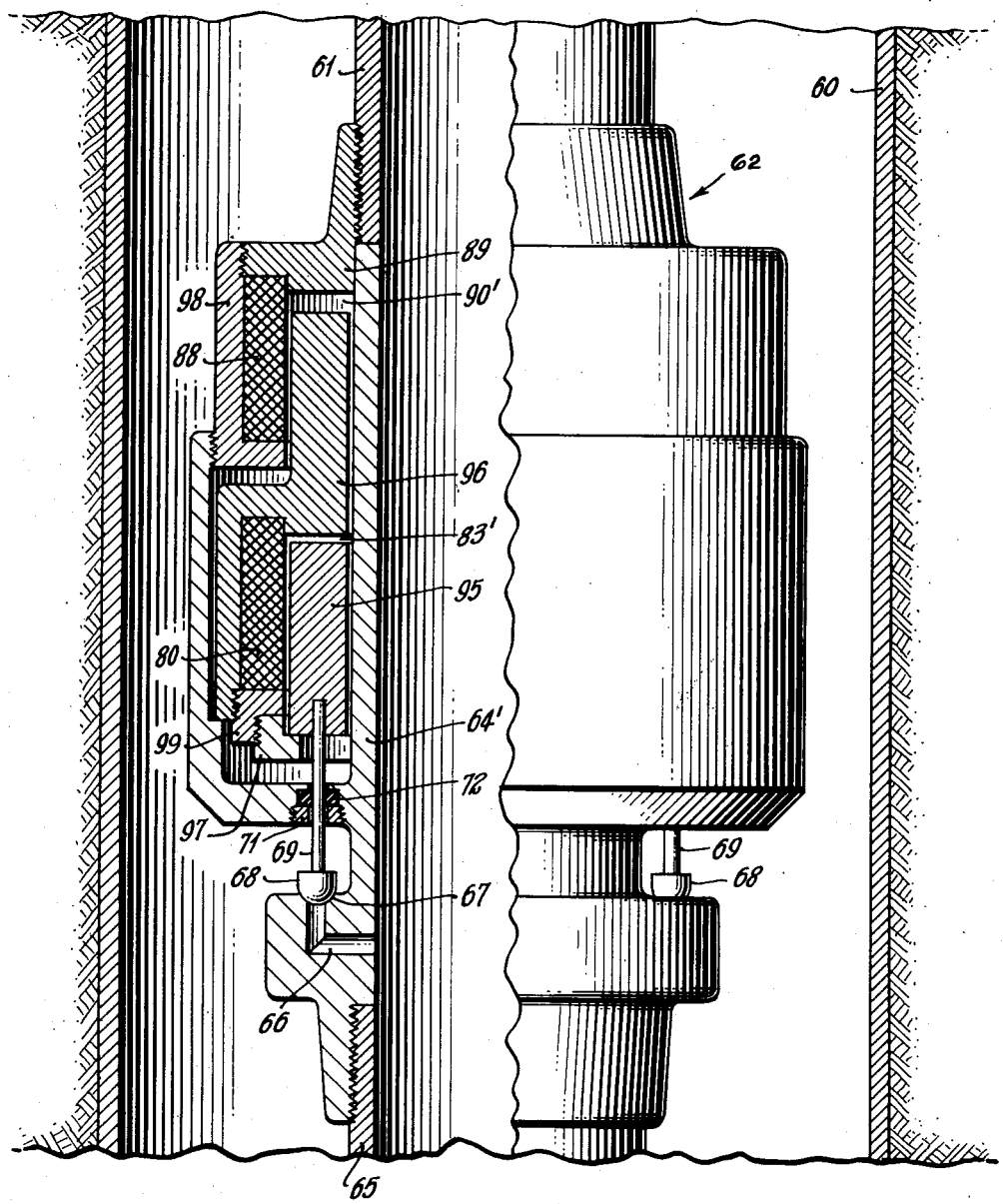
Figure 3 is a view, partially in section, of a solenoid operated valve assembly adapted for use in gas-lift operations.

In Figure 3 there is shown a valve assembly embodying the principles of this invention which is particularly adapted for use in gas-lift operations. A well casing is illustrated generally by numeral 60. Within casing 60 there is suspended a string of drill tubing 61 to which is attached a valve assembly 62 for admitting gas from the annular space between tubing 61 and casing 60 into the interior of tubing 61. Valve assembly 62 includes an annular housing 64′ of non-magnetic material which is threaded at its lower end to a second section of tubing 65. The lower portion of housing 64′ forms the body of the valve assembly and is provided with a plurality of passages 66 which communicate between the interior of the tubing and the exterior thereof. The outer portions of passages 66 form valve seats 67 which receive respective valve heads 68. Valve stems 69 are attached to valve heads 68 and extend upward therefrom through respective passages in housing 64′, each of which is provided with a plug 71 carrying a sealing ring 72.

Valve stems 69 are suspended directly from a first annular armature 95 which is disposed about housing 64′. An annular armature assembly 96 also surrounds a portion of housing 64′ and normally rests thereon. A first annular base 97 is threaded to a second annular base 99 which is threaded to armature assembly 96. Base 99 supports a solenoid 80 which encloses armature 95 and base 97 supports armature 95. An annular housing member 98 is threaded to housing 64′ and supports a solenoid 88 which encloses the upper portion of armature assembly 96. Plug 89 is threaded to housing 98 and tubing 61.

Application of energizing current to solenoid 80 lifts armature 95 through air gap 83′ and application of energizing current to solenoid 88 lifts armature assembly 96 through the second longer air gap 90′. This operation is similar to the operation of the valve assembly of Figure 2.

In some application of the electromagnetic device of this invention it may be desirable to replace the illustrated flat-faced plunger armatures 30, 44, and 96 by armatures of conical-faced, cylindrical-faced, stepped-cylindrical-faced, tapered-faced or truncated-conical configurations. It is desired, however, that armatures 23, 47, and 95 be flat-faced because of the powerful tractive forces generated by such a configuration at short air gaps.

From the foregoing description it should be apparent that there is provided in accordance with this invention an improved electromagnetic device which is adapted to provide both a powerful force over a short stroke and a second less powerful force over a second longer stroke. While the mechanism is particularly useful in opening valves, it should be evident that it is not limited thereto. The apparatus can be made any desired size and constructed of various materials convenient and suitable for the particular applications anticipated. While the invention has been described in conjunction with present preferred embodiments thereof it should be apparent that the scope of the invention is not limited thereto.

What is claimed is:

1. An electromagnetic device, comprising, in combination, a first armature having a flat-faced upper end, a first solenoid encircling the upper portion of said first armature, means forming a first housing of magnetic material adapted to carry said first armature, said first housing together with said first armature providing a first magnetic path completely enclosing said first solenoid except for a first space through which said first armature moves in an upward direction when said first solenoid is energized, said first space serving as a first air gap defined in part by said flat-faced upper end of said first armature and a flat-faced surface of an adjacent depending portion of said first housing, the latter surface serving as a stop limiting upward movement of said first armature, a second armature surmounting said first armature and integral with said first housing, said second armature having a flat-faced upper end, a second solenoid encircling the upper portion of said second armature, means forming a second housing a magnetic material which together with said second armature provides a second magnetic path completely enclosing said second solenoid except for a second space through which said second armature moves in an upward direction when said second solenoid is energized, said second space serving as a second air gap defined in part by said flat-faced upper end of said second armature and a flat-faced surface of an adjacent depending portion of said second housing, the latter surface serving as a stop limiting upward movement of said second armature, said first air gap being shorter than said second air gap whereby the tractive force of said first solenoid is of a greater magnitude than that of said second solenoid, an electromagnetic actuated member operatively secured to said first and second armatures, a voltage source, and means to apply said voltage source across both of said first and second solenoids simultaneously, whereby said member is moved a first distance in an upward direction by the force of said first solenoid and said member is moved a second further distance in an upward direction by the force of said second solenoid alone, the movement of said member being normally opposed by a force which is reduced substantially when said member completes its said upward movement through said first distance.

2. An electromagnetic device, comprising, in combination, a first armature having a flat-faced upper end, a first solenoid encircling the upper portion of said first armature, the upper end of said first solenoid extending above the flat-faced upper end of said first armature and the lower end of the latter depending below the lower end of said first solenoid, means forming a first housing of magnetic material adapted to carry said first armature and said first solenoid, said first housing and said first armature together providing a first magnetic path which completely encloses said first solenoid except for a first space through which said first armature moves in an upward direction when said first solenoid is energized, said first space serving as a first air gap defined in part by said flat-faced upper end of said first armature and a flat-faced surface of an adjacent portion of said first housing which depends from the upper end of said first solenoid, the latter surface serving as a stop limiting upward movement of said first armature, a support member supporting said first housing, a second armature surmounting said first armature and integral with said first housing, said second armature having a flat-faced upper end, a second solenoid encircling the upper portion of said second armature, the upper end of said second solenoid extending above the flat-faced upper end of said second armature and the lower end of the latter depending below the lower end of said second solenoid, means forming a second housing of magnetic material which together with said second armature provides a second magnetic path completely enclosing said second solenoid except for a second space through which said second armature moves in an upward direction when said second solenoid is energized, said second housing being mounted on said support member above said first housing, said second space serving as a second air gap defined in part by said flat-faced upper end of said second armature and a flat-faced surface of an adjacent portion of said second housing which depends from the upper end of said second solenoid, the latter surface serving as a stop limiting upward movement of said second armature, said first air gap being shorter than said second air gap whereby the tractive force of said first solenoid is of a greater magnitude than that of said second solenoid, an electromagnetic actuated member operatively secured to said first and second armatures, a voltage source, and means to apply said voltage source across both of said solenoids simultaneously, whereby said member is moved a first distance in an upward direction by the force of said first solenoid and said member is moved a second further distance in an upward direction by the force of said second solenoid alone, the movement of said member being normally opposed by a force which is reduced substantially when said member completes its said upward movement through said first distance.

3. A valve assembly comprising, in combination, conduit means having a passage communicating between the interior and exterior of said conduit means and terminating in a valve seat on the exterior of said conduit means, a first annular armature encircling said conduit means and having a flat-faced upper end, a first solenoid encircling the upper portion of said first armature, means forming a first annular housing of magnetic material positively attached to said conduit means, said first housing and said first armature together providing a first magnetic path completely enclosing said first solenoid except for a first annular space through which said first armature moves in an upward direction when said first solenoid is energized, said first space serving as a first air gap defined in part by said flat-faced upper end of said first armature and a flat-faced surface of an adjacent portion of said first housing, the latter serving as a stop limiting upward movement of said first armature, a second annular armature surmounting said first armature and integral with said first housing, said second armature having a flat-faced upper end, a second solenoid encircling the upper portion of said second armature, means forming a second annular housing of magnetic material operatively connected to said conduct means, said second housing and said second armature together providing a second magnetic path completely enclosing said second solenoid except for a second annular space through which said second armature moves in an upward direction when said second solenoid is energized, said second space serving as a second air gap defined by said flat-faced upper end of said second armature and a flat-faced surface of an adjacent portion of said second housing, said first air gap being smaller than said second air gap whereby the tractive force of said first solenoid is of greater magnitude than that of said second solenoid, a voltage source, means to apply said voltage source across said first and second solenoid whereby the latter are energized, a valve head engageable with said valve seat, and an electromagnetic actuated member comprising a valve stem connected to said valve head and operatively connected to said first and second armatures, whereby said valve head is lifted off said valve seat a first distance by the force of said first solenoid and said valve head is lifted off said valve seat a second further distance by the force of said second solenoid alone, the lifting of said valve head being normally opposed by a force which is substantially reduced when said valve head is lifted through said first distance.

4. A valve assembly comprising, in combination, conduit means having a passage communicating between the interior and exterior of said conduit means and terminating in a valve seat on the exterior of said conduit means, a first annular armature encircling said conduit means and having a flat-faced upper end, a first solenoid encircling the upper portion of said first armature, the upper end of said first solenoid extending above said flat-faced upper end of said first armature and the lower end of the latter depending below the lower end of said first solenoid, means forming a first annular housing of magnetic material adapted to carry said first armature and said first solenoid, said first housing and said first armature together providing a first magnetic path completely enclosing said first solenoid except for a first space through which said first armature moves in an upward direction when said first solenoid is energized, said first housing being mounted on said conduit means, said first space serving as a first air gap defined in part by said flat-faced upper end of said first armature and a flat-faced surface of an adjacent portion of said first housing which depends from the upper end of said first solenoid, the latter surface serving as a stop limiting upward movement of said first armature, a second annular armature surmounting said first armature and integral with said first housing, said second armature having a flat-faced upper end, a second solenoid encircling the upper portion of said second armature, the upper end of said second solenoid extending above the flat-faced upper end of said second armature and the lower end of the latter depending below the lower end of said second solenoid, means forming a second housing of magnetic material which together with said second armature provides a second magnetic path completely enclosing said second solenoid except for a second space through which said second armature moves in an upward direction when said second solenoid is energized, said second housing being mounted on said conduit means, said second space serving as a second air gap defined in part by said flat-faced upper end of said second armature and a flat-faced surface on an adjacent portion of said second housing which depends from the upper end of said second solenoid, the latter surface serving as a stop limiting upward movement of said second armature, said first gap being shorter than said second air gap whereby the tractive force of said first solenoid is of a greater magnitude than that of said second solenoid, an electromagnetic actuating member comprising a valve stem and operatively connected to said first and second armatures, a valve head connected to said valve stem and engageable with said valve seat, a voltage source, and means to apply said voltage source across both of said solenoids simultaneously, whereby said valve head is lifted off said valve seat a first distance by the force of said first solenoid and said valve head is lifted off said valve seat a second further distance by the force of said second solenoid alone, the said lifting of said valve head being normally opposed by a force which is reduced substantially when said valve head is lifted through said first distance.

References Cited in the file of this patent

UNITED STATES PATENTS

| | | |
|---|---|---|
| 723,119 | Zweigbergk | Mar. 17, 1903 |
| 1,672,193 | Bason | June 5, 1928 |
| 2,039,300 | Drake | May 5, 1936 |
| 2,445,561 | Carnagua | July 20, 1948 |
| 2,556,675 | Carnagua | June 12, 1951 |
| 2,637,343 | Matthews | May 5, 1953 |
| 2,644,404 | Bobo | July 7, 1953 |
| 2,693,929 | Hart | Nov. 9, 1954 |

FOREIGN PATENTS

| | | |
|---|---|---|
| 6,753 | Great Britain | June 3, 1885 |
| 4,827 | Norway | Aug. 10, 1896 |
| 219,745 | Great Britain | Aug. 5, 1924 |

UNITED STATES PATENT OFFICE
CERTIFICATE OF CORRECTION

Patent No. 2,901,210                          August 25, 1959

Glen G. Hebard

It is hereby certified that error appears in the printed specification of the above numbered patent requiring correction and that the said Letters Patent should read as corrected below.

Column 5, line 4, for "a magnetic" read -- of magnetic --; column 6, line 30, for "conduct" read -- conduit --.

Signed and sealed this 7th day of June 1960.

(SEAL)
Attest:

KARL H. AXLINE                                            ROBERT C. WATSON
Attesting Officer                                        Commissioner of Patents